Feb. 8, 1944. D. R. CLEMONS 2,341,362
APPARATUS FOR CASTING MOUNTING SURFACES ON ELECTRICAL
CONDENSERS AND THE LIKE
Filed Oct. 24, 1941 2 Sheets-Sheet 1
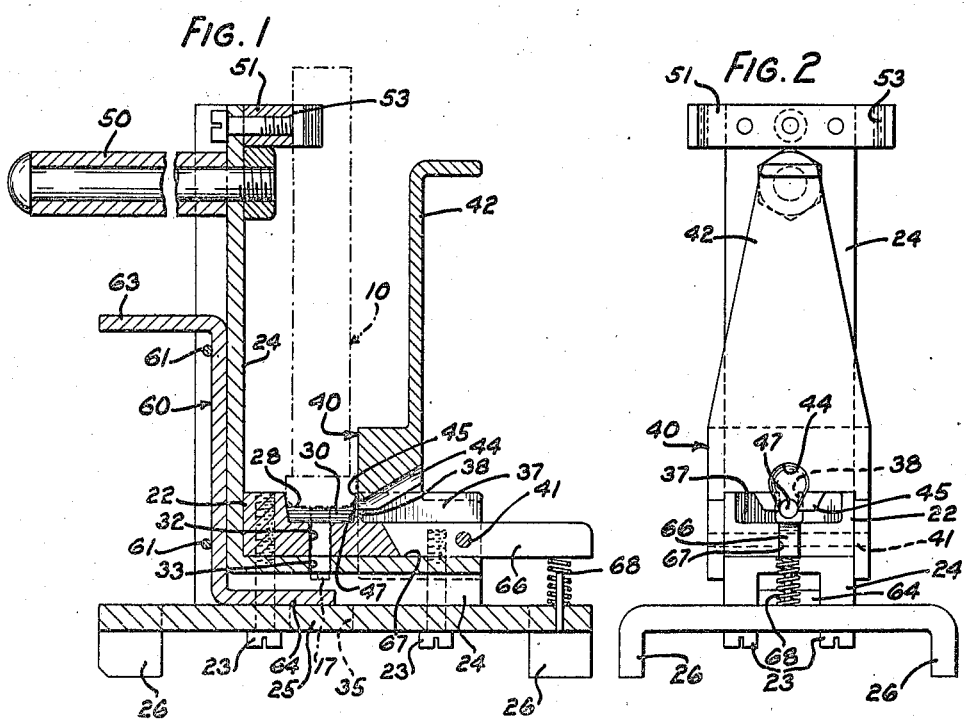
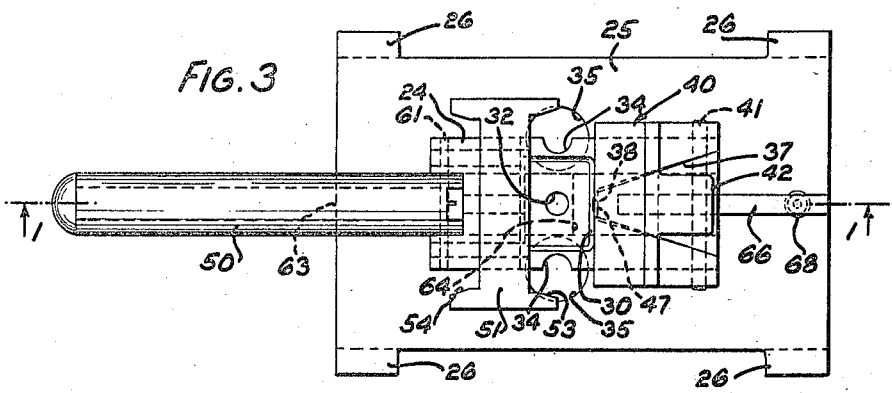
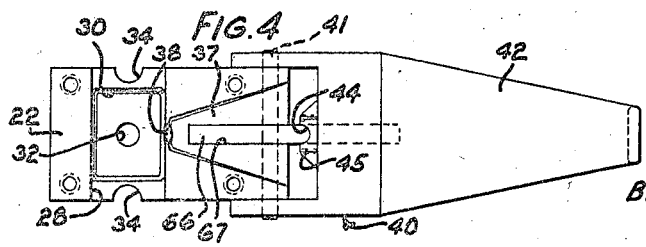
INVENTOR
D. R. CLEMONS
BY *Harry P. Duft*
ATTORNEY

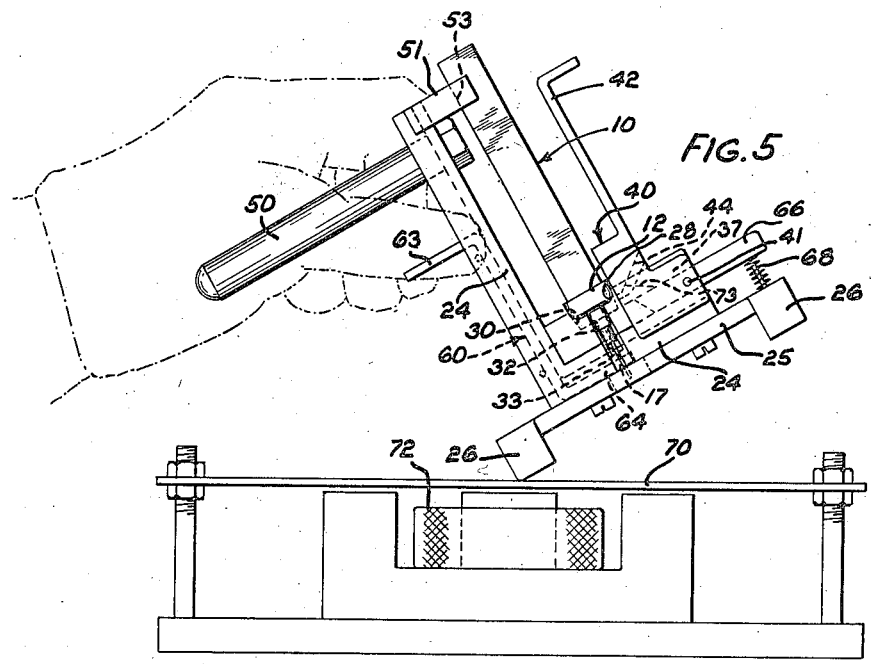
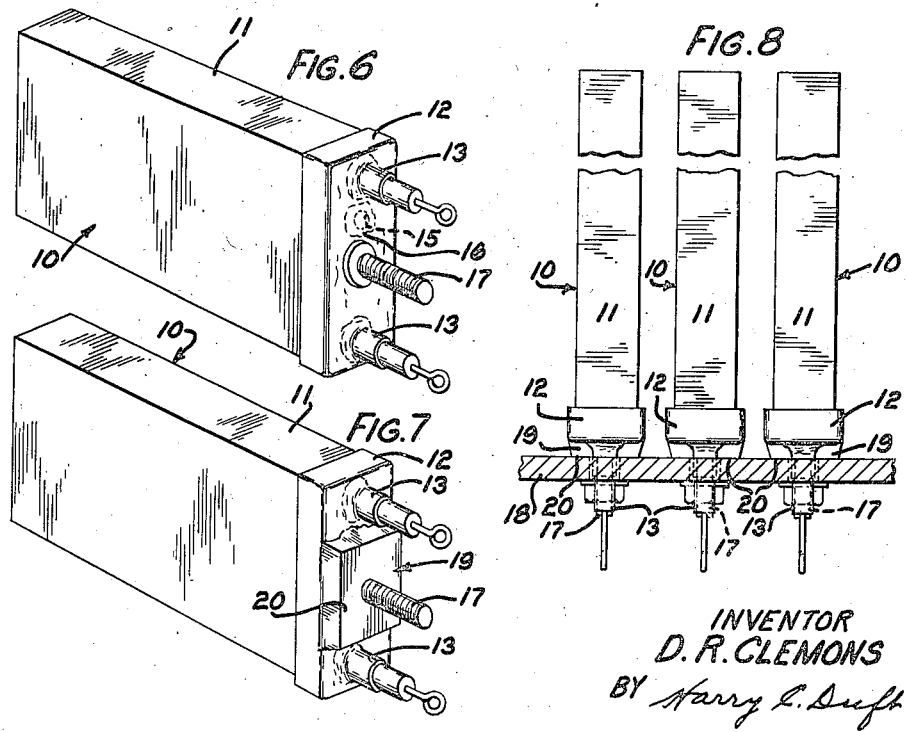

Patented Feb. 8, 1944

2,341,362

UNITED STATES PATENT OFFICE 2,341,362

APPARATUS FOR CASTING MOUNTING SURFACES ON ELECTRICAL CONDENSERS AND THE LIKE

Dale R. Clemons, Riverside, Ill., assignor to Western Electric Company, Incorporated, New York, N. Y., a corporation of New York Application October 24, 1941, Serial No. 416,287

4 Claims. (Cl. 22—58)

This invention relates to apparatus for casting mounting surfaces on electrical condensers and the like, and more particularly to an apparatus for molding or casting directly upon electrical condensers, flat surfaced embossments or mounting blocks for maintaining the condensers accurately aligned with respect to the mounting plates or panels to which the condensers are subsequently attached.

Electrical condensers, particularly those of the type which are sealed in metal containers, are sometimes attached to flat supporting members or mounting plates by means of mounting studs which are anchored in the sealed covers of the condenser containers and project perpendicularly therefrom. It is essential, in some instances, that such condensers be accurately aligned with respect to the supporting member or mounting plate to present a pleasing appearance and/or to permit the mounting of a plurality of condensers on close centers. However, the presence of the usual soldered terminal posts and soldered filling holes on the condenser covers usually presents an irregular surface surrounding the mounting studs which, heretofore, has rendered it difficult and costly to properly align such condensers with respect to the mounting plates.

Objects of the invention are to provide a simple, inexpensive and practical apparatus for molding or casting directly on condensers or the like, an embossment or mounting block adapted to engage and cooperate with a surface of the condenser supporting member to insure proper alignment of the condenser with respect to the supporting member.

In accordance with the above objects, one embodiment of the invention contemplates the provision of apparatus for casting a mounting surface on a condenser, in which the condenser is placed in an aligning and molding fixture having a mold cavity and means by which the condenser is aligned with respect to the mold cavity, after which the mold cavity is filled with a molten metal capable of subsequently hardening or setting directly on the condenser in the form of a block or embossment having the desired mounting surface. Mechanism is provided for vibrating the molding fixture during the pouring operation in order to avoid porosity in the cast mounting block and to improve the contour thereof.

A complete understanding of the invention may be had from the following detailed description when read in conjunction with the accompanying drawings, in which Fig. 1 is a vertical sectional view of a molding fixture embodying the invention, the section being taken on line 1—1 of Fig. 3;

Fig. 2 is a side elevational view of the fixture;

Fig. 3 is a plan view thereof;

Fig. 4 is a plan view of the mold and gate member, the latter being shown in the open position;

Fig. 5 is a front elevational view showing the manner in which the fixture is held in a tilted position upon an electromagnetically vibrated plate during the pouring of the molten metal into the mold cavity;

Fig. 6 is a perspective view of an electrical condenser adapted to be provided with a cast mounting block by the apparatus of the present invention;

Fig. 7 is a perspective view of an electrical condenser that has been provided with a cast mounting block by the apparatus of the invention; and Fig. 8 shows several such condensers attached to a mounting plate.

Referring now to the drawings, there is illustrated in Fig. 6 an electrical condenser 10 of a well-known type employed in telephone communication systems. The illustrated condenser comprises an outer metal casing or container 11 having a sealed-on cover 12 to which are soldered the two terminal posts 13—13. The cover is provided with the usual filling hole 15 which is sealed by a globule of solder 16. A mounting stud 17 is anchored to the cover for use in attaching the condenser to a supporting panel or mounting plate 18, as shown in Fig. 8.

In accordance with a feature of the present invention, a flat surfaced embossment or mounting block 19 (Fig. 7) is molded or cast directly on the cover adjacent to and surrounding the mounting stud 17. This mounting block is preferably composed of a lead-antimony-tin alloy, but other alloys, as well as various non-metallic molding materials, may be used. It is necessary, only, that the mounting block be firmly attached to the condenser cover and that it have a flat outer surface 20 for engaging and cooperating with the mounting plate to maintain the condenser substantially perpendicular to the mounting plate, as shown in Fig. 8.

A preferred form of molding fixture for casting the molding block on the condenser cover is illustrated in Figs. 1 to 5, inclusive, of the drawings. It comprises a mold block 22, which is removably attached by screws 23 to the base of an L-shaped frame 24, the latter being attached by the same screws to a supporting plate 25. This plate has four downwardly turned flanges 26, 26, which serve as supporting legs for the fixture when placed on a table or work bench.

The condenser is placed in the molding fixture in an inverted position, as shown in broken lines in Fig. 1, and it will be noted that the mold block 22 of the fixture is formed on its upper surface with a depression 28 which conforms to and accommodates the cover of the condenser. Within this depression and centered with respect thereto is a mold cavity 30 (Figs. 1 and 4) which is shaped to conform to the shape of the embossment or mounting block to be cast on the condenser cover, and the bottom of the mold cavity is flat so as to form a flat mounting surface on the cast mounting block.

Mold block 22 and supporting frame 24 are provided with aligned close fitting apertures 32 and 33, respectively, for accommodating the mounting stud 17 of the condenser. Notches 34, 34 (Figs. 3 and 4) are provided in the mold block and frame for accommodating the terminal posts 13 of the condenser and two apertures 35, 35 are provided in the base plate 25 for receiving the condenser terminals.

To the right of the mold cavity 30, a tapered depression or filling trough 37 is provided in the upper surface of the mold block and a slot 38 in the adjoining wall of the mold cavity connects the cavity with the trough.

A gate member 40 is hinged or pivoted on the protruding ends of a fixed horizontal pin 41 mounted in the mold block. This gate member is provided with a suitable handle 42, by means of which it may be opened and closed. The gate is formed with a tapered groove 44, which terminates at its smaller end in a slotted projection 45. When the gate is closed, as shown in Figs. 1, 2 and 3, the slotted projection 45 cooperates with the slotted wall of the mold cavity to provide an inlet opening 47 (Fig. 2) for the mold cavity, and it will be obvious that the tapered groove 44 of the gate is adapted to cooperate with the tapered depression 37 in the mold block to guide and direct the molten metal toward the inlet opening 47.

To the upper end of the upstanding portion of frame 24, there is attached a suitable handle 50 and a channeled guide or gauge block 51. The gauge block is provided on opposite sides thereof with two guide channels 53 and 54 for accommodating the body portion of the condenser and these guide channels are of different widths so that by simply reversing the gauge block, the fixture may be adjusted to handle condensers of two different sizes.

The frame 24 is of channel cross section and an ejecting bar 60 is vertically slidable therein behind fixed retaining pins 61—61, as best shown in Fig. 1. This ejecting bar has a horizontal outwardly extending handle portion 63 at its upper end and a horizontal inwardly extending arm 64 at its lower end. When the ejecting bar is manually lifted, by means of the handle portion 63, the arm 64 is adapted to press upwardly on the stud 17 of the condenser to lift the condenser out of the mold.

An auxiliary ejector in the form of a lever 66 is provided for cooperating with ejecting bar 60 to remove the condenser and the attached cast mounting block from the mold. This ejector lever is pivoted on the horizontal pin 41 and operates in a slot 67 in the mold block. A coil spring 68 is arranged to press upwardly against the outer end of the lever so that the inner end thereof is normally held in its retracted position within the slot 67. When in this position, the upper surface of the lever is flush with the bottom of the filling trough 37 of the mold block.

In the operation of the above-described molding fixture, a condenser is placed therein in an inverted position, as shown in broken lines in Fig. 1, with the mounting stud 17 inserted in the apertures 32 and 33 and with the body of the condenser lying in the channel 53 of gauge block 51. The condenser is thus positioned perpendicular to the flat bottom surface of the mold cavity 30. With the condenser so positioned, the gate 40 is closed and the fixture is held in a tilted position upon a vibratory plate 70, as shown in Fig. 5. By means of an electromagnet 72, the plate is vibrated while molten metal is poured into the mold cavity through the inlet opening 47 by way of the filling trough 37. The fixture is vibrated by the vibrating plate, thus forcing the molten metal into all corners of the mold cavity.

A sufficient amount of molten metal is poured into the mold to completely fill the mold cavity and then rise in the filling trough 37 to the level indicated at 73 in Fig. 5. After the metal in the mold has been allowed to "set," the fixture is removed from the vibrating plate, the gate 40 is opened, and the condenser with the block of metal cast thereon is ejected from the fixture. The ejection is accomplished by manually lifting the ejector bar 60 to lift the condenser and cast block out of the mold while the outer end of ejector lever 66 is pressed downwardly so that the inner end thereof is projected upwardly to eject from the filling trough 37 the protruding burr formed on the cast block by the overflow of metal into the filling trough. This protruding burr is then removed by clipping it off with close cutting pliers, thus leaving attached to the condenser cover a cast mounting block 19 (Fig. 7) having smooth side edges and a flat surface 20 for engaging and cooperating with the mounting plate to maintain the condenser perpendicular with respect to the mounting plate, as shown in Fig. 8.

It will be obvious that the invention is not limited to the specific embodiments thereof herein illustrated and described, except insofar as is defined by the appended claims.

What is claimed is:

1. In an apparatus for casting a mounting block around a mounting stud projecting from an end of an article, a mold block having in a surface thereof an aperture for receiving said mounting stud and a mold cavity surrounding said aperture, said mold cavity having a slot in a side wall thereof, a gate hinged on said mold block and having a portion bridging said slot to provide a restricted inlet port for said mold cavity, and a slidable ejector engageable with the mounting stud for dislodging the cast mounting block from the mold cavity.

2. In an apparatus for casting a mounting block around a mounting stud projecting from an end portion of an article, a support, a mold block thereon having in a surface thereof a depression for receiving the said end portion of the article and an aperture within said depression for receiving said mounting stud, said mold block having a mold cavity surrounding said aperture and a filling trough for said cavity, a gate hinged to said mold block for bridging said filling trough at its junction with the mold cavity to provide a restricted inlet port for said cavity, and an ejector slidable in the support and engageable with the mounting stud for dislodging the cast block from the mold cavity.

3. A casting apparatus comprising a mold block having a mold cavity, said cavity having a slot in a side wall thereof, and a gate hinged on said mold block and having a portion bridging said slot to provide a restricted inlet port for said mold cavity.

4. An apparatus for casting a mounting block around a mounting stud projecting from an article, a mold block having in a surface thereof an aperture for receiving said mounting stud and a mold cavity surrounding said aperture, said mold cavity having a slot in a side wall thereof, and a gate hinged on said block and having a portion bridging said slot to provide a restricted inlet port for said mold cavity.

DALE R. CLEMONS.